(12) United States Patent
Wu et al.

(10) Patent No.: US 6,721,642 B1
(45) Date of Patent: Apr. 13, 2004

(54) METHOD OF GENERATING A CALIBRATION CRASH SENSOR OUTPUT PULSE

(75) Inventors: Chi-Chin Wu, West Bloomfield, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/368,899

(22) Filed: Feb. 20, 2003

(51) Int. Cl.$^7$ ................................................. G06G 7/48
(52) U.S. Cl. ................. 701/45; 703/8; 703/6; 280/735; 340/438
(58) Field of Search ................ 701/45, 47; 703/8, 703/6; 340/438; 244/122 G; 280/735

(56) References Cited

U.S. PATENT DOCUMENTS

| | | | | |
|---|---|---|---|---|
| 4,950,915 A | * | 8/1990 | Spies et al. | 307/10.1 |
| 5,000,030 A | | 3/1991 | Umeda et al. | 73/1.39 |
| 5,185,701 A | | 2/1993 | Blackburn et al. | 701/45 |
| 5,337,238 A | * | 8/1994 | Gioutsos et al. | 701/47 |
| 5,345,402 A | | 9/1994 | Gioutsos et al. | 703/8 |
| 5,884,203 A | | 3/1999 | Ross et al. | 701/45 |

* cited by examiner

*Primary Examiner*—Marthe Y. Marc-Coleman
(74) *Attorney, Agent, or Firm*—Frank A. MacKenzie

(57) ABSTRACT

A method of generating a calibration crash sensor pulse using the combination of a generated high frequency band of response (HFB) from a non-destructive impact test and a generated low frequency band (LFB) of response from computer aided engineering analysis.

8 Claims, 3 Drawing Sheets

Time
High Frequency Band

Time
Low Frequency Band

Time
Sensor Pulse Sample

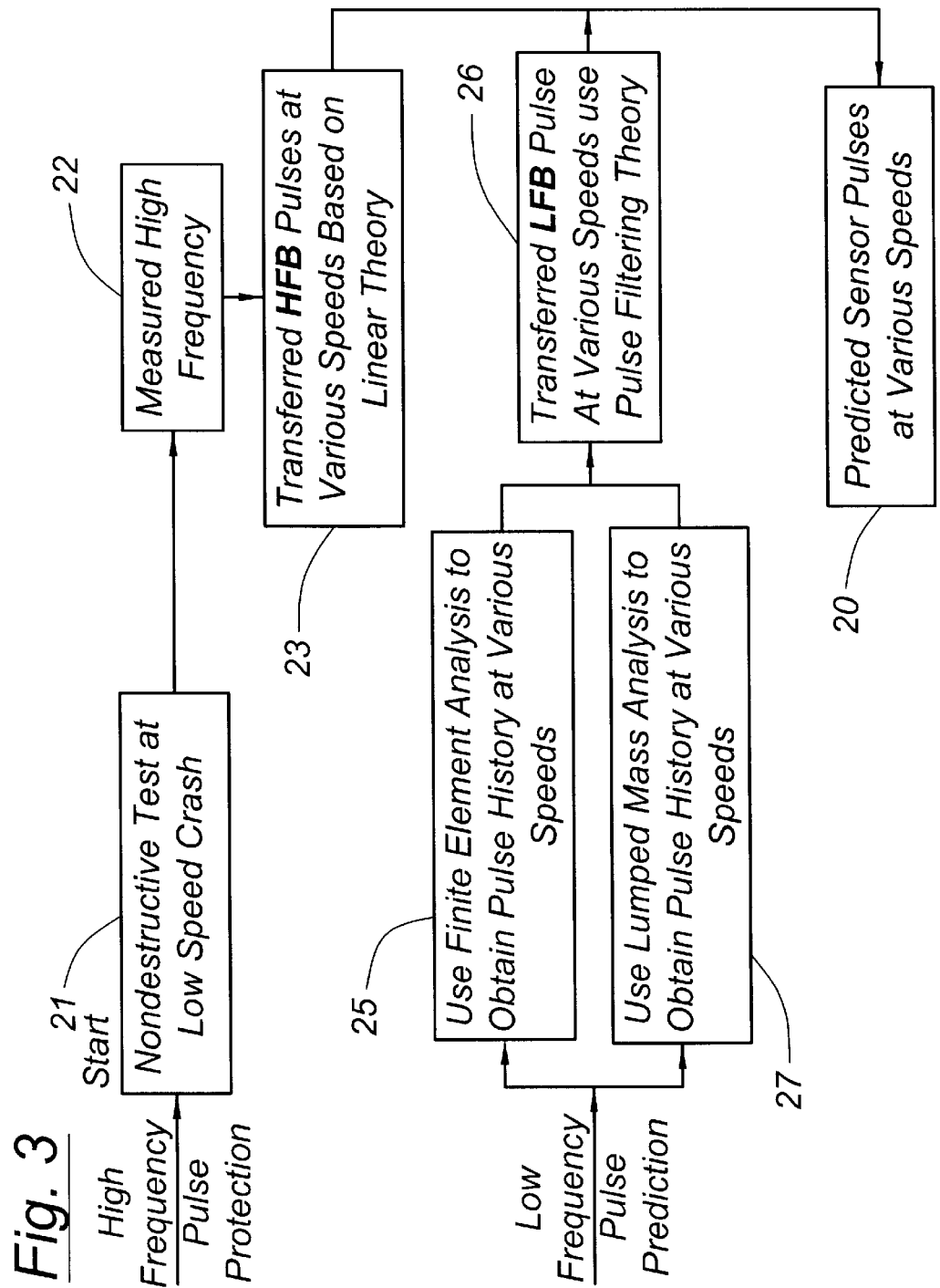

METHOD OF GENERATING A CALIBRATION CRASH SENSOR OUTPUT PULSE

BACKGROUND OF THE INVENTION

1. Field of the Invention

The invention relates to a method for generating output calibration response characteristics of crash sensors, including those used in vehicle collision tests.

2. Disclosure Information

Many vehicles are equipped with passenger restraint systems incorporating an air bag for protecting vehicle passengers in the event of a crash. In order to deploy the air bag at the proper time, it is known in the art to employ specialized sensors and associated circuitry for detecting a crash event that may threaten an occupant's life so as to release the air bag at the appropriate time. In order to be effective, the passenger restraint system must be able to separate crash events which would require deployment of the air bag, and those crash events in which deployment of the air bag would be unnecessary or undesirable.

For example, it is known to measure the dynamic response characteristics of a prototype crash accelerometer wherein the accelerometer to be tested is fixed to a vehicle and the vehicle is crashed. The crash can produce an impulsive wave impinging on the accelerometer, thus generating an electrical output from the crash accelerometer.

Such crash sensor pulse samples obtained from the sensor prototype tests at various speeds and test modes for vehicle sensor calibrations and development are very expensive and time consuming. For each speed at which a test is executed there is destructive testing of a prototype vehicle and crash sensor. Using computer aided engineering (CAE) methods to predict the crash sensor pulses are also unreliable because of the high sensitivity of structural complexity on high frequency band of response. These are some of the problems this invention overcomes.

SUMMARY OF THE INVENTION

This method generates a calibration crash sensor output pulse at a plurality of crash speeds from the combination of a generated high frequency band pulse output (HFB) and a generated low frequency band pulse output (LFB). Destructive testing is not necessary to generate the calibration crash sensor output pulse at a plurality of crash speeds. The calibration crash sensor output pulses can then be used to test an air bag firing control module for proper operation. That is, when vehicle crash conditions are met, the firing control module should produce an air bag firing signal. As a result, air bag system development is simplified.

The HFB pulse is an elastic wave, which travels along a vehicle system at the speed of sound and is sensitive to impact location and system complexity such as joints, mounts, and other components. The LFB pulse is a non-elastic wave that depends on vehicle system stack-up and crush deformation.

The LFB pulse can be obtained from traditional finite element analysis or lumped masses model analysis. Such models are typically created during production of a vehicle prototype and are well known in the art. This invention recognizes that such CAE methods can be advantageously used in to generate a LFB pulse component of a calibration crash sensor output pulse.

The HFB pulse normally is difficult to be predicted by CAE methods. The inventive method uses either of two options to obtain the high frequency band pulse. A first option uses a nondestructive test to obtain the HFB pulse at low vehicle speed and then uses a linear transformation method to convert the HFB of low vehicle speed to other HFBs of other higher vehicle speeds. A second option uses only the highest vehicle crash speed test crash sensor output to obtain the HFB pulse and then uses a linear transformation method to convert the one highest crash speed test crash sensor output HFB pulse to the HFB pulses of other lower crash speed test crash sensor outputs.

Once the LFB and HFB pulses are obtained, the crash sensor calibration output pulse can be constructed by combining the two frequency band pulses. The crash sensor calibration output pulse can then be used to test the response of an air bag firing module. When a calibration crash sensor pulse indicating a crash event when air bag firing is required is received by an air bag firing module, an air bag firing signal should be generated by the air bag firing module. On the other hand, if the calibration crash sensor pulse is a type that does not require air bag module firing, the air bag firing module should not generate an air bag firing signal.

Accordingly, a significant advantage of this invention is the ability to avoid destructive testing. As discussed, crash sensor pulse samples obtained from the sensor prototype tests at various speeds and test modes for vehicle sensor calibrations and development are very expensive and time consuming. For each speed at which a test is executed there is destructive testing of a prototype vehicle and crash sensor. Using computer aided engineering (CAE) methods to predict the crash sensor pulses may lack reliability in some cases because of the high sensitivity of structural complexity in the high frequency band of response. These are some of the problems this invention overcomes.

BRIEF DESCRIPTION OF THE DRAWINGS

FIG. 3 is a block diagram showing how nondestructive testing is used to predict crash sensor output pulses at various vehicle speeds.

DETAILED DESCRIPTION OF THE PREFERRED EMBODIMENTS

Figure 1:
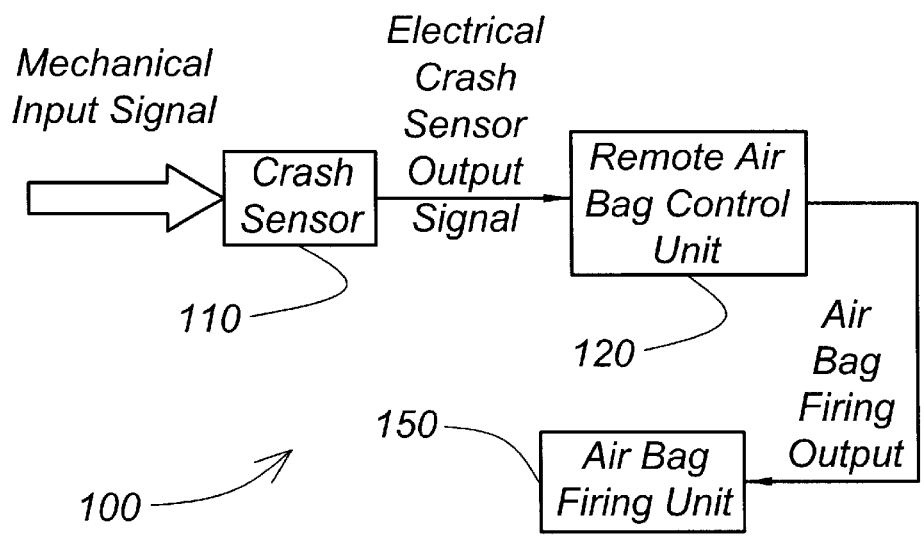
FIG. 1 is a typical block diagram of an air bag firing system for a vehicle.

Referring to FIG. 1, a typical air bag firing system 100 includes a crash sensor 110 that receives a mechanical input signal such as a vehicle crash. Crash sensor 110 produces an electrical crash sensor output signal that is applied to a remote air bag control unit 120. Control unit 120 typically is a microprocessor that contains an algorithm to decide whether or not control unit 120 should produce an air bag firing output. The output of control unit 120 is connected to an air bag firing unit 150. It would be desirable to generate typical outputs at various vehicle speeds from crash sensor 110 without destructive testing of the vehicle and crash sensor 110. To this end, processing the electrical output pulse of crash sensor 110 under various mechanical pulse conditions applied to crash sensor 110 generates a crash sensor calibration pulse. By using a known mechanical pulse a determination can be made whether or not control unit 120 makes the correct decision whether or not to fire the air bag. The mechanical pulses measured by a crash sensor, which then generates an analog electrical output, contain two kinds of wave characteristics.

Figure 2A:
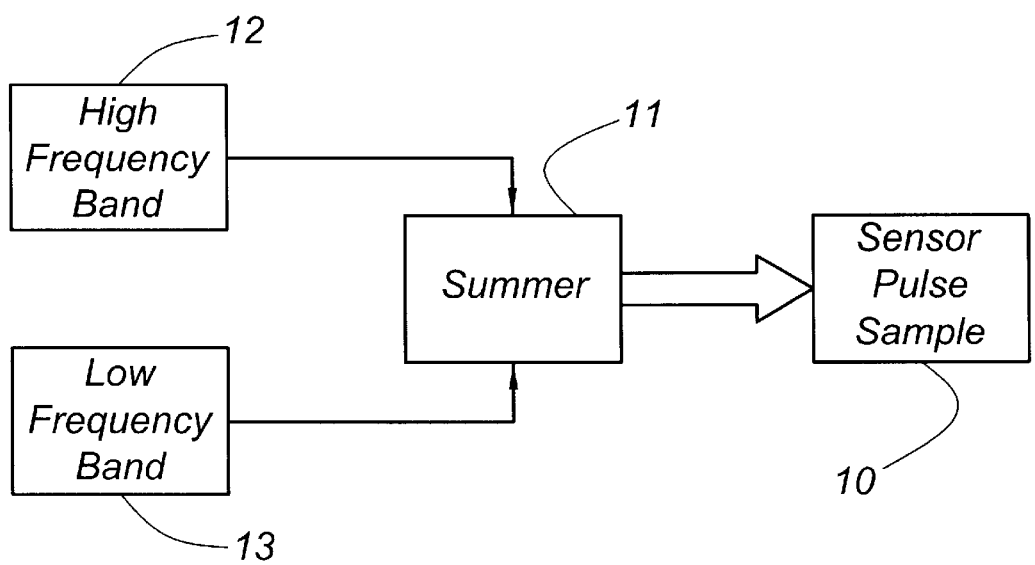
FIG. 2a is a schematic flow diagram of an embodiment of this invention wherein pulses from a low frequency band and pulses from a high frequency band are combined to form a calibration crash sensor output pulse.

The two characteristics can be decomposed from the pulse in low frequency band (LFB) and high frequency band (HFB) as shown in FIG. 2a. More specifically, FIG. 2a is a schematic flow diagram of an embodiment of this invention wherein pulses from a low frequency band and pulses from a high frequency band are combined to form a calibration crash sensor output pulse, and includes the basic block diagram. A combined sensor pulse sample block 10 receives an input from a summer 11. In turn, summer 11 has an input from a high frequency band generator 12 and a low frequency band generator 13. The outputs of generators 12 and 13 are combined so the output of pulse block 10 indicates firing of a vehicle airbag under appropriate conditions.

Figure 2B:
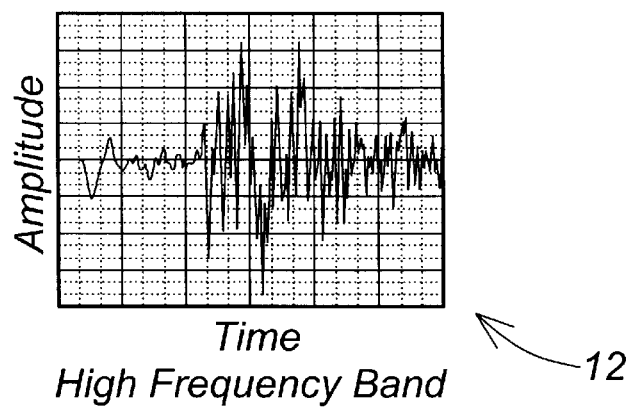
FIG. 2b illustrates a basic high frequency band waveform.
Figure 2C:
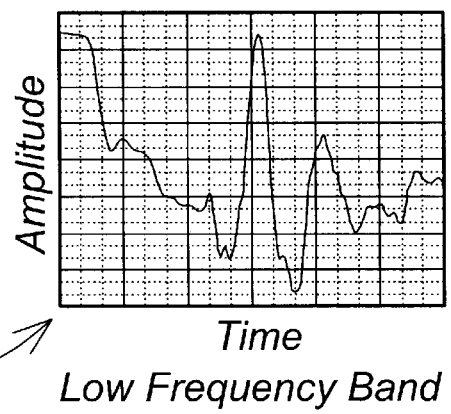
FIG. 2c illustrates a basic low frequency band waveform.
Figure 2D:
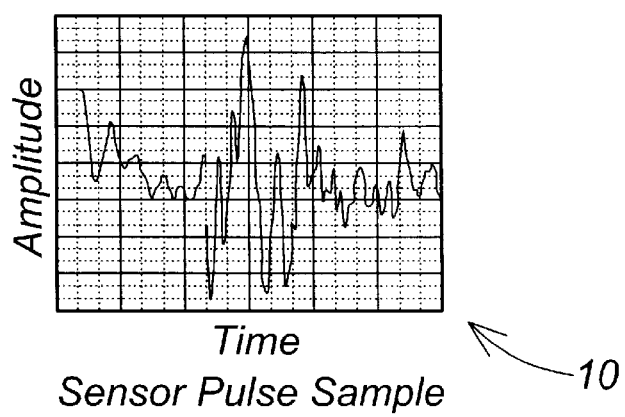
FIG. 2d illustrates a basic combined calibration crash sensor waveform.

FIG. 2b illustrates the basic high frequency band waveform. FIG. 2c illustrates the basic low frequency band waveform. FIG. 2d illustrates the basic combined calibration crash sensor waveform.

The LFB pulse is an in-elastic wave. The integration of LFB indicates the permanent damage of vehicle system therefore can be a useful indicator for measuring the severity of impact. The HFB pulse is an elastic shock wave emanated from the impact location. The integration of HFB pulse indicates no energy lost due to no permanent damage of vehicle system. The HFB pulse signals the arrival time and impact location measured at the sensor location. The method, as partially shown in FIG. 2a, includes a process and approach to obtain the LFB and HFB pulses separately. The LFB pulse can be obtained from the traditional finite element analysis or a simplified parametric mode analysis, such as lumped masses model analysis. The HFB pulse of various vehicle impact speeds can be obtained, in accordance with this invention, from the nondestructive impact test (same test mode but with low enough vehicle impact speed to be nondestructive) or a single destructive crash test. The HFB pulse is an elastic pulse and therefore can be predicted using linear transformation methods.

Referring to FIG. 3, there is shown a block diagram of the generation of the high frequency band and low frequency pulse band prediction methodology. A predicted sensor pulse block 20 provides an indication of various predicted sensor pulses at various vehicle impact speeds combining HFB and LFB sensor pulses predicted at various vehicle impact speeds. A high frequency band pulse (HFB) prediction logic flow starts with a nondestructive test a low speed crash at a start block 21. A crash sensor in start block 21 generates a HFB signal in response to the nondestructive crash of the vehicle. Thus, start block 21 generates an impulsive pulse prediction using a non-destructive test at a low vehicle impact speed. Measured high frequency band (HFB) block 22 receives an input from block 21 and applies an output to a transferred HFB pulses at various speed based on linear theory block 23. Linear theory block 23 uses linear transformations to change the HFB of low speed crash sensor output to any number of HFB of higher speed crash sensor outputs. Such high-speed crashes would have been destructive of the vehicle and have been avoided through use of this transformation. The output of HFB pulse from the transformation of linear theory block 23 is then applied to predicted crash sensor pulse block 20. The particular parameters of the transformation depend upon vehicle characteristics and can be developed as is known in the art.

Still referring to FIG. 3, a low frequency pulse (LFB) prediction logic flow starts with a finite element analysis on a destructive test at a finite element analysis (FEA) block 25 or a Lumped Mass Analysis (LMA) model on a destructive test at block 27. Normally, the lumped mass model can also be obtained from a finite element simulation if there is no correction tool available. The outputs of block 25 and block 27 are applied to a LFB pulse filtering theory block 26. LFB block 26 uses a low frequency generator to produce LFB pulse. The output of LFB pulse filtering block 26, as well as HFB pulses linear theory block 23, is applied to the input of predicted crash sensor pulse block 20.

Advantageously, to generate high frequency crash sensor pulses at various vehicle speeds a vehicle speed slow enough to be nondestructive is chosen. It is also possible to choose a vehicle speed that is high enough to be destructive and then use vehicle crash sensor output from that higher speed test to develop crash sensor signals at other speeds. In any case, the invention advantageously uses a single crash sensor output at a given vehicle speed to develop crash sensor outputs at other vehicle speeds.

Consider the situation of a vehicle with an acceleration $a^1$, represented by an acceleration pulse measured at a sensor location, hitting a rigid wall with a resisting force $F^1(t)$. Thus a vehicle acceleration force opposing a resisting force $F(t)$ of a barrier or rigid wall, such as when a vehicle hits on obstacle. According to Newton's Law of motion and Dynamic Finite Element formulation, the resisting force is equivalent to the sum of three components. The first component is the product of M, mass matrix of vehicle model with n degree of freedom and acceleration vector $\ddot{U}$. The second component is the product of C, damping matrix of a vehicle and velocity vector $\dot{U}$. The third component is the product of K, stiffness matrix of a vehicle and displacement vector U. Referring to "Finite Element Procedure in Engineering Analysis" by Klaus-Jurgen Bathe, if the dynamics equilibrium system is linear, the system equations can be decoupled into an individual equation for each frequency $\omega i$ as $$\ddot{X}i(t) + \omega i \dot{X}i(t) + \omega i^2 Xi(t) = \psi i * F^1(t) \text{ and}$$

$$\ddot{X}i(t) + \omega i \dot{X}i(t) + \omega i^2 Xi(t) = \Psi i * F^1(t) \text{ and } Uj = \sum_{i=L}^{N} \Phi_{ji} Xi \quad (1)$$

Where $\ddot{X}i$, $\dot{X}i$ and $Xi$ are the frequency responses for single degree of freedom system corresponding to frequency $\omega i$, $\phi_{ji}$ is the coefficient of a transformation matrix, and $\psi i$ is the participation factor of $F^1(t)$ to frequency $\omega i$ and $F^1(t)$ is the scalar time function. Furthermore, the acceleration $a^1(t)$ measured at a sensor location can be expressed as the summation of high frequency responses and lower frequency response as follows:

$$a^1(t) = \sum_{i=1}^{L} \Phi_1 i Xi(t) + \sum_{i=L+1}^{N} \Phi_1 i Xi = a_L^1 + a_H^1$$

where: $\phi_1 i$ are the coefficients of the transformation matrix corresponding to the frequency i at sensor location 1 where the acceleration being measured, and $a^1_H$ is high frequency acceleration pulse and $a^1_L$ is the low frequency pulse. The lower frequencies are numbered from 1 to L and the higher frequencies are numbered from 1+L to N. The solution of the High Frequency acceleration according to Klaus-Jurgen Bathe is $$a_H^1(t) = \sum_{i=L+1}^{N} \Phi_1 i X i(t) = \sum_{i=L+1} \Phi_1 i * \Psi i * \int_0^t F^1(T) h(t-T) dT, \quad (2)$$

where: h(t−T) is a sinusoid function, $\sin(\omega_i(t-T))$, and $$\int_0^t F^1(T)h(t-T)dT$$

can be obtained using the integration algorithm called Duhamel integral.

Similarly, for the destructive test, assuming the high frequency pulses can be still obtained from the linear system (the lower frequency pulse is no longer valid by using linear transformation approach), the ratio of $a^1_H$ and $a^2_H$ will be $$\frac{a_H^2}{a_H^1} = \frac{\sum_{\omega l} \Phi_1 i * \Psi i * \int_0^t F^2(T)h(t-T)dT}{\sum_{\omega l} \Phi_1 i * \Psi i * \int_0^t F^1(T)h(t-T)dT} \quad (3)$$

Therefore the High Frequency Pulse $a^2_H$ of destructive test (high speed) can be expressed as $$a_H^2 = a_H^1(t) \left[ \frac{\int_0^t F^2(T)h(t-T)dT}{\int_0^t F^1(T)h(t-T)dT} \right] \sim \left[ \frac{\int_0^t F^2(T)dT}{\int_0^t F^1(T)dT} \right] = \quad (4)$$

$$a_H^1(t) \left[ \frac{\int_0^t Momentum^2(t)}{\int_0^t Momentum^1(t)} \right]$$

Equation (2) uses a barrier or rigid wall force $F^1(t)$ to create a high frequency pulse, $a^1_H$, an elastic wave. Advantageously, this is a low speed, nondestructive test. The high frequency pulse, $a^2_H$, of a higher speed test can be generated using a ratio of the integrated momentum. That is, the first elastic wave, $a^1_H$, is multiplied by the ratio of the integrated momentum of the higher speed test to the integrated momentum of the lower speed test. Thus, the high frequency elastic waves (HFB) of a higher vehicle speed test can be generated without destructive testing. If destructive testing is available, the high frequency pulse elastic wave from the destructive test can be used as a basis to generate high frequency pulses that would occur at lower, non destructive vehicle speeds, and high frequency pulses that would occur at higher, destructive vehicle speeds The integration of momentum can be obtained from the finite element analysis. Although the finite element analysis may not be reliable to predict the high frequency part of momentum, the integrated momentum is only contributed by the lower frequency part of momentum because of the zero energy contribution of the elastic pulse. The finite element analysis is therefore appropriate and valid for the calculation of the ratio of integrated momentum.

Various modifications and variations may be made to the methods and apparatus described without departing from the true spirit and scope of the claimed invention. Those familiar with the art to which this invention relates will recognize various alternative designs and embodiments for practicing the invention as defined by the following claims.

What is claimed is:

1. A method of generating a calibration crash sensor output pulse for air bag system development including the steps of:

predicting a high frequency band of response portion of the crash sensor output pulse;

predicting a low frequency band of response portion of the crash sensor output pulse;

combining the high frequency band pulse and the low frequency band pulse to form a calibration crash output pulse;

using logic analysis on the calibration crash output pulse; and generating an air bag firing signal only if the step of using logic analysis indicates the occurrence of a vehicle crash requiring activation of the air bag.

2. A method of generating a calibration crash sensor output pulse as recited in claim 1 wherein the step of predicting a high frequency band of response is done from a non-destructive impact test.

3. A method of generating a calibration crash sensor pulse as recited in claim 1 wherein the step of predicting a high frequency band of response is done using a single destructive test.

4. A method of generating a crash sensor crash pulse as recited in claim 1 wherein the step of predicting a low frequency band of response is done using a computer aided engineering analysis including using a lumped mass model to generate lower frequency responses and using finite element analysis to generate lower frequency responses.

5. A method of generating a calibration crash sensor output crash pulse as recited in claim 2 including the steps of using a linear transformation to obtain the high frequency band pulse at high speed from the high frequency band pulse at low speed.

6. A method of generating a calibration crash sensor output crash pulse as recited in claim 5 including generating a high frequency pulse using an integrated momentum ratio, wherein a first elastic wave is multiplied by the ratio of the integrated momentum of a higher speed test to the integrated momentum of a lower speed test, so that the high frequency elastic waves of a higher vehicle speed test can be generated without destructive testing.

7. A method of generating a calibration crash sensor output pulse as recited in claim 5 including generating a high frequency band pulse using a integrated momentum ratio, wherein destructive testing is used and a high frequency band pulse extracted from the destructive test is being used as a basis to generate high frequency band pulse that would occur at any other vehicle speeds.

8. A method of testing an air bag firing system including generating a calibration crash sensor output pulse for air bag system development and applying the calibrations crash sensor output pulse to an air bag firing control module, said method including the steps of:

predicting a high frequency band of response portion of the crash sensor output pulse, by using a nondestructive impact test and, by using a linear transformation to obtain the high frequency band pulse at other crash speeds, including generating a high frequency pulse function using an integrated momentum ratio, wherein a first function representing a first elastic wave is multiplied by the ratio of the integration of momentum of a higher speed test to the integration of momentum of a lower speed test, so that the high frequency elastic waves of a higher vehicle speed test can be generated without destructive testing;

predicting a low frequency band of response portion of the crash sensor output pulse using computer aided engineering analysis including using lumped mass model to generate lower frequency responses;

combining the high frequency band pulse and the low frequency band pulse to form a calibration crash sensor output pulse;

using logic analysis on the calibration crash output pulse to determine if air bag activation is required;

applying the calibration crash output pulse to the air bag firing control module; and generating an air bag firing signal only if the step of using logic analysis indicates the occurrence of a vehicle crash requiring activation of the air bag.

* * * * *